Patented Aug. 5, 1930

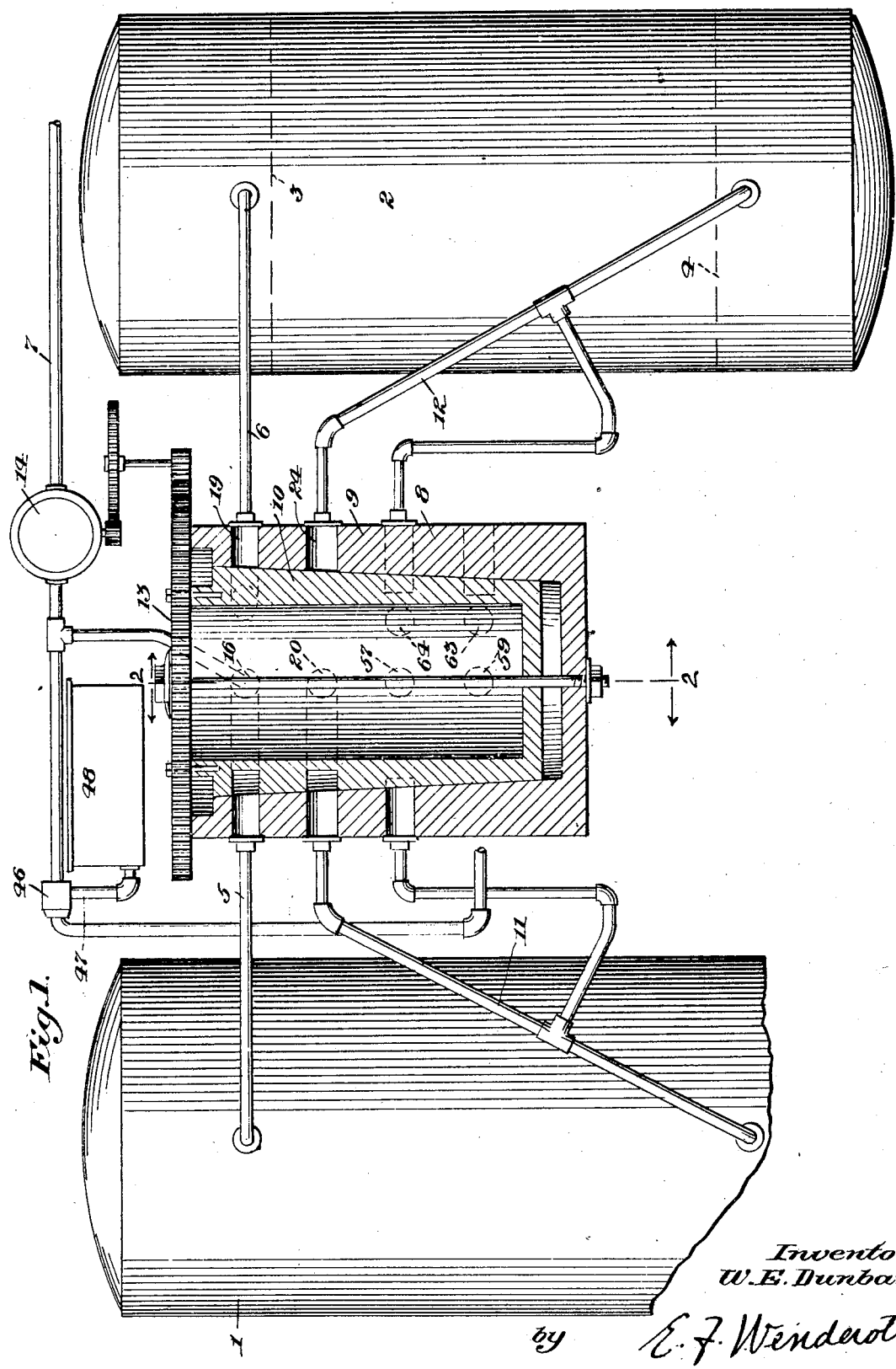

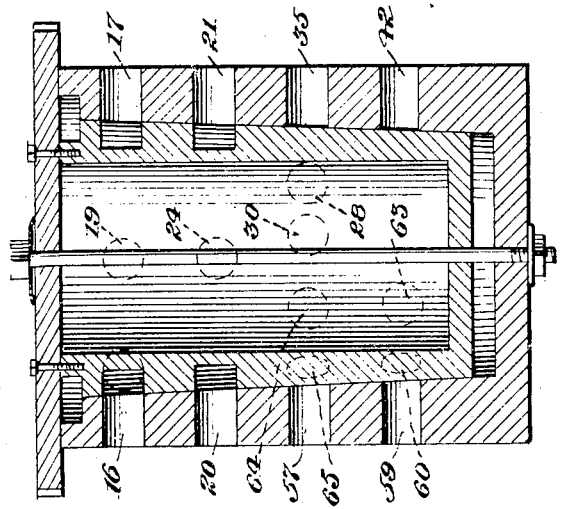

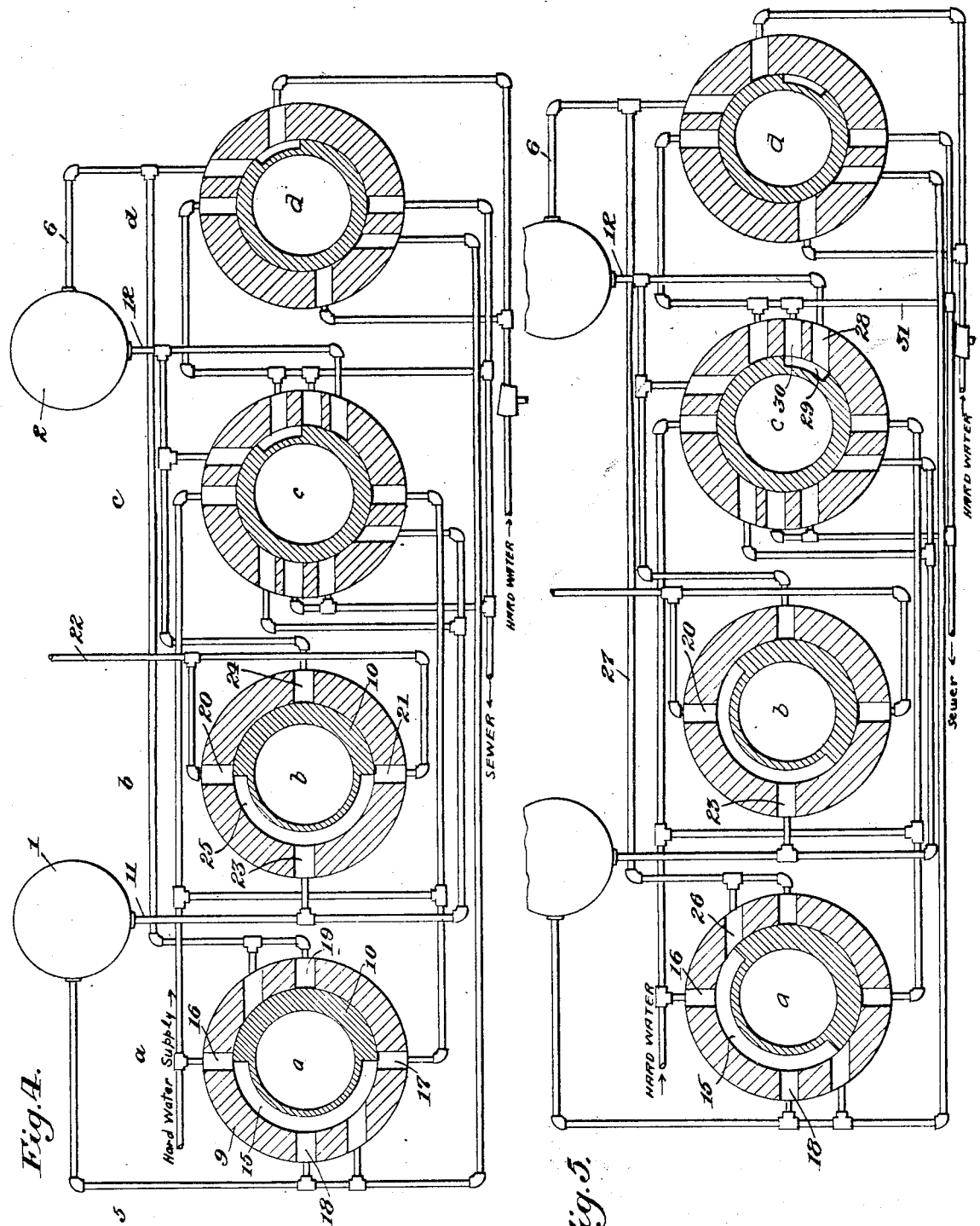

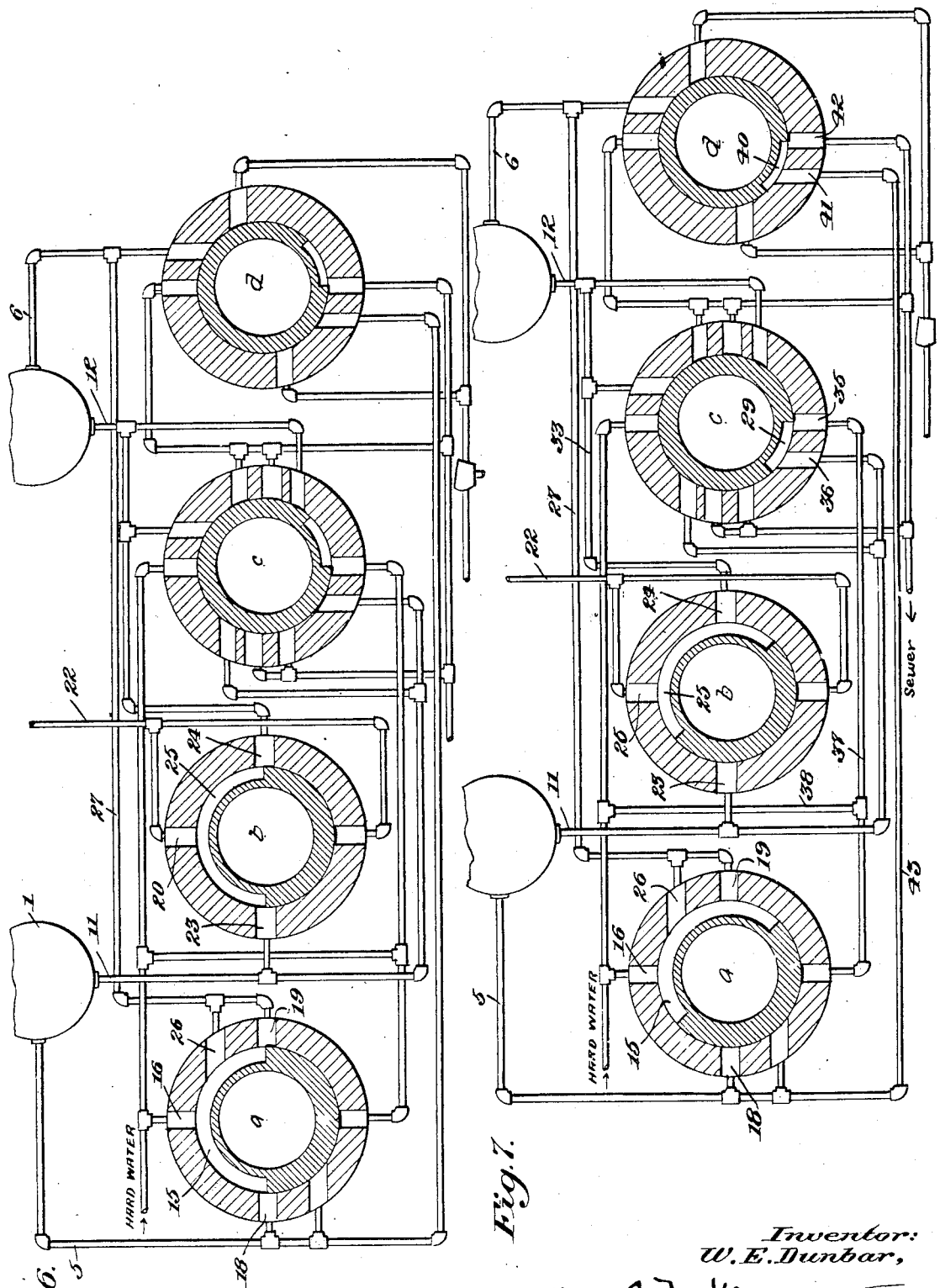

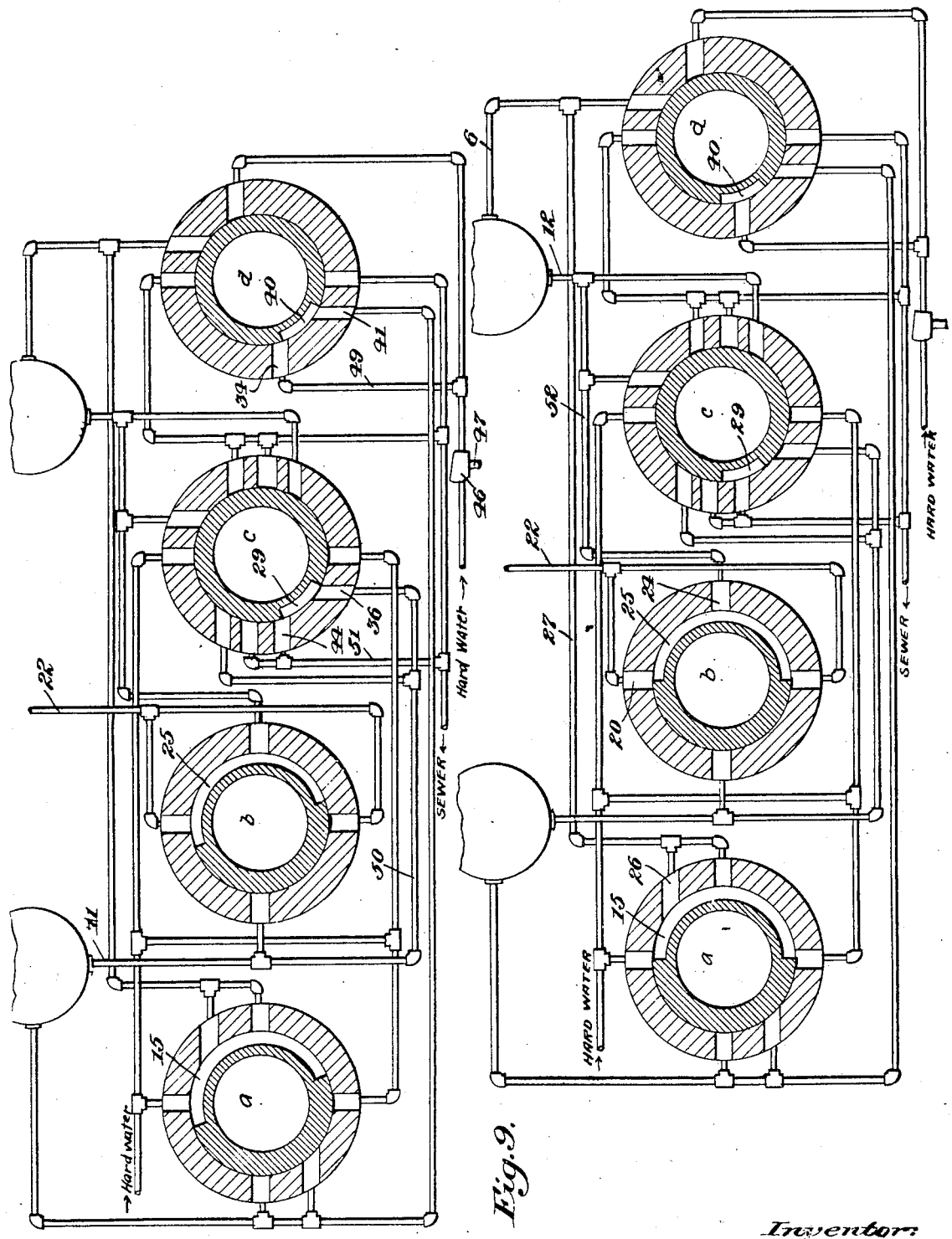

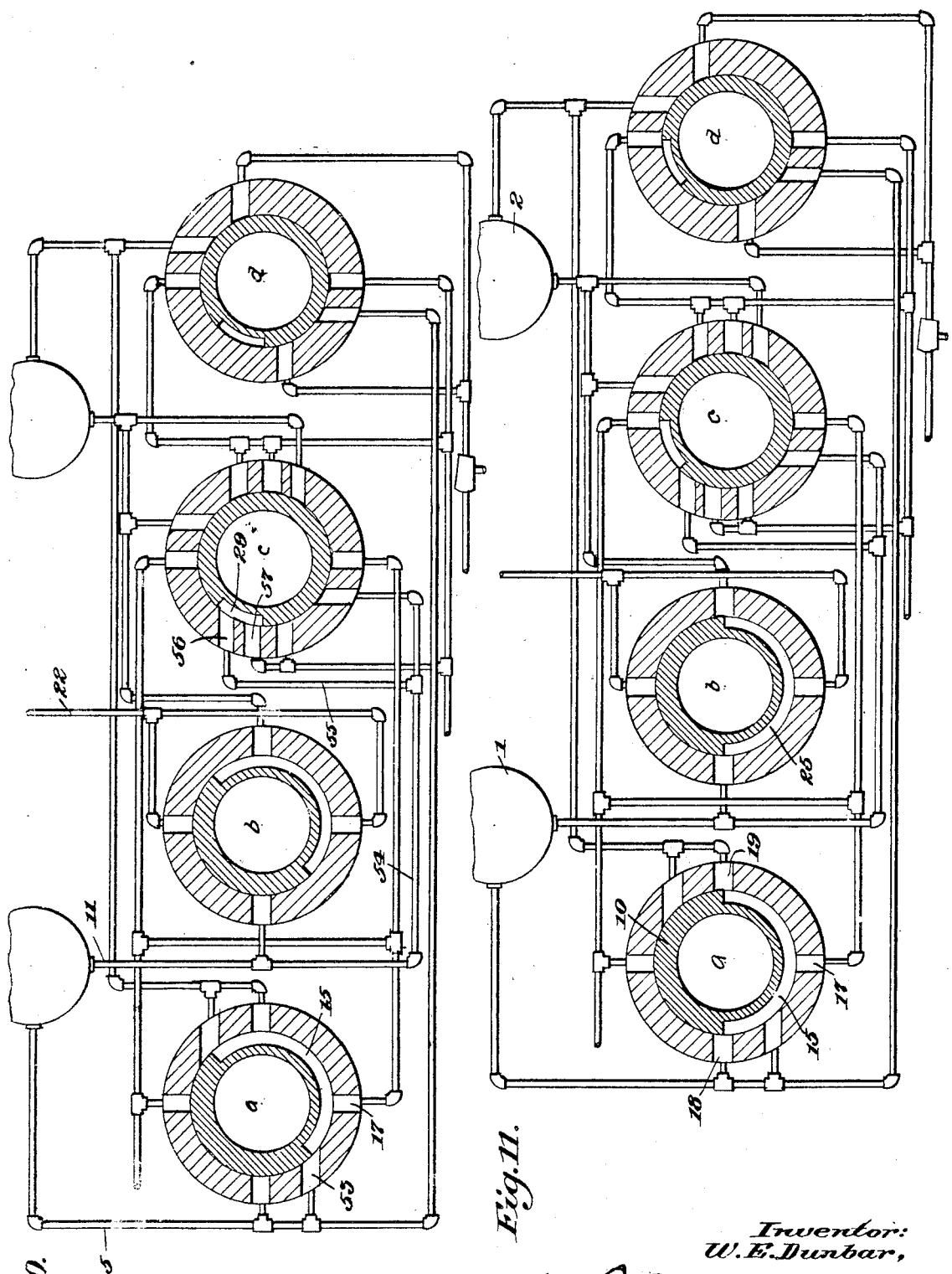

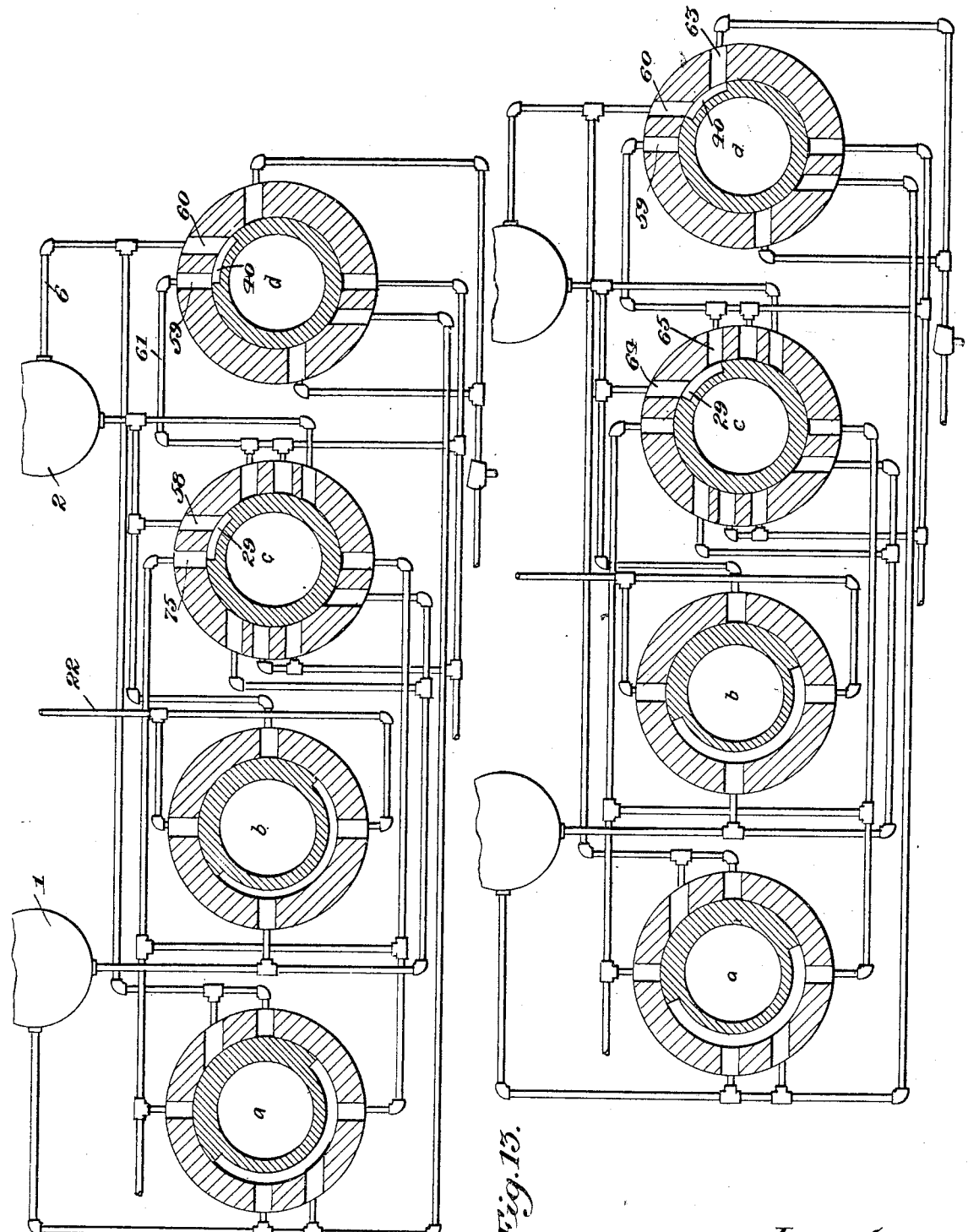

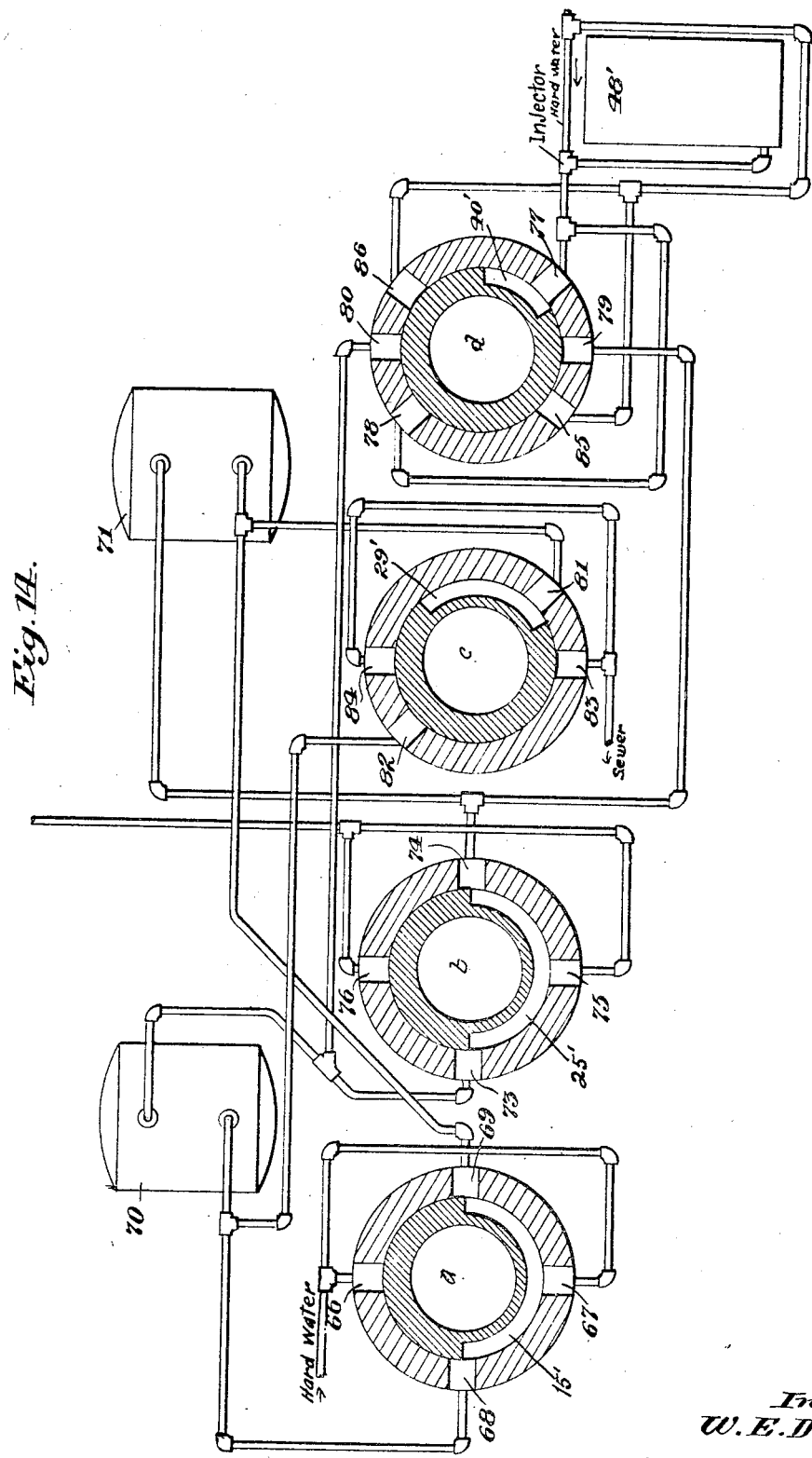

1,772,134

UNITED STATES PATENT OFFICE

WILLIAM E. DUNBAR, OF JACKSONVILLE, FLORIDA, ASSIGNOR TO FLORIDA WATER SOFTENER INC., OF JACKSONVILLE, FLORIDA, A CORPORATION OF FLORIDA

WATER-SOFTENING SYSTEM

Application filed May 8, 1929. Serial No. 361,482.

This invention relates to water softening systems and in particular to systems of the zeolite regenerative type in which a supply of soft water is always available in the system, by the provision of duplicate softener tanks arranged to be alternately withdrawn from the srevice for the purpose of regeneration of the zeolite.

As is well known, the cycle of operation of each unit in such a softener system as the present invention contemplates, involves the following phases: the softening phase in which hard water is caused to percolate through the mass of zeolite gravels, issuing as soft water; and then successively the regenerative phases consisting first of a back flow of hard water through the zeolite for the purpose of loosening the gravels and physically cleaning the zeolite; admitting brine, for regenerating the zeolite and restoring to it its exhausted softening properties, and flushing, to rid the zeolite of the brine before the effluent is again conducted to the soft water service.

In certain systems, in which the hard water flows upwardly during the softening phase, the cleansing back wash is omitted, as being superfluous.

The present invention has for one of its objects the control of the several phases of the duplicated units, in such a way that at all times there is a constant maximum supply of hard water available to the system, and a constant maximum supply of soft water available for withdrawal from the system, ensuring that regardless of the demands upon the system, a full supply of completely softened water shall always be at hand. This is in contrast to some systems in which, when the softeners approach the time when one is at the end of its softening phase and the other about to begin its softening phase, there is a "tapering off" in the available flow of softened water, so that there may be an inadequate supply at these transition periods.

Another object of the invention is the provision of a single control valve for governing all of the functions of the correlated softening units.

A further object of the invention is to provide for driving the single control means by an element of action which is responsive to the admission of hard water to the system, whereby the action of such single control means shall be synchronous with the flow of the hard water into the system.

Other objects of the invention will appear as the following description of a preferred embodiment thereof proceeds.

In the drawings:

Fig. 1 is a vertical section showing duplicate correlated softening tanks and the single control valve by which all of the functions of the softening tanks are governed.

Figs. 2 and 3 are sections taken along the line 2—2 of Fig. 1, viewed from opposite directions.

Figs. 4 to 13 are diagrammatic views showing sections taken in planes perpendicular to the axis of the control valve in the four zones of ports and channels with which the valve in the preferred embodiment is provided.

Fig. 14 is a diagrammatic view somewhat similar to the views shown in Figs. 4 to 13 showing the invention in slightly modified form.

Referring now in detail to the several figures, and adverting first to Fig. 1, two softener tanks 1 and 2 are shown, these being of a conventional type known as the "down flow" in which the hard water is admitted at the top of a mass of zeolite sand or gravel, the same being represented by the space between the broken lines 3 and 4, the hard water becoming softened in the course of its percolation through the zeolite, and issuing as soft water from the bottom of the mass of zeolite. Each of the softeners functions through a cycle of the following phases: the period of softening, in which the hard water percolates the zeolite as aforesaid from the top to the bottom. In this phase the zeolite acts also as a filter for foreign particles and animalcules, etc., in the hard water, these being deposited upon the upper surface of the mass of zeolite. At the end of the softening phase, the soft water service conduit and the direct admission of hard water to the top of the softener is cut off and there follows the "back wash" phase in which hard water is caused to flow in a counter direction through the zeolite, that is to say, upwardly, stirring up the particles of the zeolite and washing the deposited foreign matter, etc., from the upper surface of the zeolite. This back wash discharges into a drain or sewer. Next, while the soft water service conduit is still closed, the regenerative brine flow is admitted, the brine flowing through the zeolite from the top to the bottom of the mass, in which phase the calcium salts which the zeolite has abstracted from the hard water during the previous softening period are exchanged for sodium salt in the brine. The spent brine is discharged into the waste pipe or sewer.

At the conclusion of the regenerative phase, the brine flush takes place, hard water being admitted to the top of the zeolite for the purpose of thoroughly flushing away all traces of brine before the softener is again operatively connected to the soft water service. The brine flush water also passes into the sewer. Following this, the softening phase recurs, the service conduit being again made available for the withdrawal of soft water, as desired.

Duplicate units of softeners are used with their cycles of functions so displaced that when one softener is being regenerated, the other is in its softening phase. Thus one softener is always in readiness to serve soft water, thereby ensuring a continuous supply of soft water.

In the present invention as will later be more fully described, the softening periods in each unit, continue from more than half the cycle so that in the operation of the units, the softening periods overlap to the extent that the volume of water available throughout the entire cycle of operation of the softeners is invariable and at the maximum capacity of the softeners.

Referring again to Fig. 1, it will be observed that the softeners 1 and 2 are connected at their upper parts by branches 5 and 6 to a hard water main, usually part of a city pressure system, through the intermediary of a valve, in general designated by the reference character 8. This valve comprises a casing 9 and a barrel 10 having cooperating ports and channels. The ports are suitably connected by conduits only some of which are shown in this view, and through which the entire cycle of functions of the two softeners is controlled.

The topmost zone of ports and channels, in the present example, is concerned with the distribution of hard water; the next lower zone with the distribution of the soft water, and it is shown connected to the lower parts of the softeners by the pipes 11 and 12, while the two lower zones are associated with the back wash, brine regenerative functions and the flushing away of the brine. The valve barrel is rotated by gearing 13 actuated by the rotor of the water meter 14. Thus the valve rotates only when the meter is working, that is to say, only when water is passing through the meter.

This takes place whenever soft water is being drawn from the service pipe, or during the back wash period, whether or not soft water is being drawn at the time, or during the period of brine flow in those installations in which metered water is used as the vehicle for the brine, and for the purpose of the brine flush.

Referring now to Figs. 4 to 13 inclusive, each of these indicates by the reference characters $a$, $b$, $c$ and $d$, sections through the port zones of the single valve, beginning at the top. In Fig. 4 it will be observed that the channel 15 in the top zone, which distributes hard water to the softeners, both for softening and for brine wash, has an angular amplitude of 180° and that according to its position, it connects always with the hard water supply either by the port 16 or by the port 17 according to the position of rotation of the valve and it is always to be noted that this channel also serves the main ports 18 and 19 which are positioned at diametrical points. One of these ports is connected with the softener 1 and the other with softener 2. A glance at section $b$ which represents next to the top zone of the valve, shows a similar position for the ports 20 and 21, which communicate with the soft water service pipe 22, and for the ports 23 and 24 which are connected to the respective softeners by the pipes 11 and 12, and it shows a similar orientation for the soft water channel 25.

It is obvious that as the valve barrel 10 rotates, under the action of the meter 14, the softener 1 will be simultaneously connected to the hard water supply and to the soft water service pipe, and that this connection continues through an angle of 180°, after which period this connection becomes occluded and the connection with the softener 2 becomes opened. To the 180° amplitude of opening afforded by the channels 15 and 25, must be added a further angle representing the diameter of the hard water ports and the soft water ports so that not only are the softeners open in the aggregate for the full cycle of rotation of the valve, but that the softening periods of the softeners overlap through an angle equal to the diameter of the ports, ensuring that as one softener is closing, at the end of its softening phase, the other is opening at a corresponding rate, whereby the full uniform maximum flow of hard and soft water is always available regardless of the transition of the softening period from one softener to the other.

When it is appreciated that the water meter by which the valve is driven rotates with extreme slowness, and that the gear reduction between the meter and valve is great, it will be understood that the overlap period may continue for hours, ensuring for the entire time an undiminished supply of soft water, in contradistinction to other systems in which the transition period is marked by a dearth of soft water.

In the position of the valve barrel shown in Fig. 4, the channel 15 is open, half to the hard water port 16 and half to the hard water port 17, making a full port opening from the hard water supply. This port is in full communication with the upper part of softener 1, by way of the port 18. By following all other pipes which connect to the ports in this zone, it will be found that they are at one place or another blocked. In the second zone, the channel 25 is open half to the service port 20 and half to the service port 21, making a full port opening to the soft water service pipe, and being in full communication with the lower part of softener 1. The port 24 leading to the softener 2 is at this time closed. Thus, softener 1 is ready to serve a full supply of softened water, and for convenience in describing the progressive functions of the system, it will be assumed that soft water is being continuously drawn and so that the meter 14 is continuously turning, and the valve being thus continuously rotated.

It will as yet not be necessary to describe the port and channel positions shown in sections c and d, representing the two lower zones of the valve.

Proceeding now to Fig. 5, it is noted that the valve barrel 10 has moved clockwise through an angle of 45°. In this new position of the valve the hard water ports 16 and 18 are still in communication by way of channel 15, while soft water ports 20 and 23 are still connected by channel 25, it being thus obvious that softener 1 is still furnishing softened water to the service pipe. But now, port 26 in the top zone, and hitherto unmentioned, begins to be opened, and by following the conduit 27 it will be seen that it connects directly to conduit 6 leading into the top of softener 2. Thus hard water for flushing purposes is admitted to the softener 2 following the regenerative action in softener 2. Conduit 12 is now opened by way of port 28 in the third zone, with the channel 29 in the plug barrel, which in turn is in communication with the port 30, the latter opening by way of pipe 31 into a drain or sewer.

Now, adverting to Fig. 6, it is observed that the valve barrel 10 has advanced a further angle of 45°. Channel 15 is now open by full port 16 to the hard water supply which is delivered by half the port 18 to the softener 1 and by half the port 19 to the softener 2. At this same time, half of each of the soft water ports 23 and 24 are in communication, on the one hand respectively with the softeners 1 and 2, and on the other hand, by way of the channel 25 and the full port 20, with the soft water service pipe 22. This is the transition period when softener 1 is closing and softener 2 is opening to the soft water service pipe, and during which soft water is drawn in part from each softener, and in aggregate quantity equal to the full maximum flow.

This is an inactive period with regard to the functions controlled by the ports and channels in the third and fourth zones (zones c and d).

Now proceeding to Fig. 7, the valve barrel 10 has moved forward 45° more. The channel 15 in the top zone no longer communicates with the port 18, and consequently the direct flow of hard water from the port 16 is cut off. Likewise the channel 25 no longer registers with the soft water port 23 which connects with the outlet of the softener 1, so that it is obvious that softener 1 is no longer delivering softened water. On the other hand, the upper part of softener 2 is now in communication with the hard water supply by way of port 16, channel 15, port 19, pipe 27, pipe 6, and concurrently the lower part of softener 2 is in communication with the soft water service pipe by way of pipe 12, pipe 33, port 24, channel 25 and port 20. Thus softener 2 has taken up entirely the function of softening and of delivering the softened water. At this time, the softener 1 is subjected to back wash in which hard water is injected contradirection, that is upwardly, through the zeolite gravels in the softener 1, stirring them up, separating them, cleansing them and washing off the deposit of foreign matter which may have collected upon the upper surface of the zeolite mass during the softening period of the apparatus. This back wash is produced by the channel 29 in the third zone of the valve barrel coming into register in ports 35 and 36, the former being connected by way of pipes 37 and 38 with the hard water supply, while the port 36 connects with the lower part of softener 1 by means of pipe 39. The back wash water is carried off to a sewer or drain by means of pipe 5, by virtue of the registering in the fourth or lowermost zone of the valve barrel, of the channel 40 with the ports 41 and 42. The first-mentioned of these ports is connected to the pipe 5 by the pipe 43, while the last-mentioned communicates with the sewer.

Now comes a period in the functioning of the valve in which the next sequential function follows at a shorter interval than thus so far described, so that Fig. 8 shows an angular advance of the valve barrel of only 22½°. The regenerative phase of softener 1 is about to take place. A glance at the first and second zones shows that the channels 15 and 25 are still in position respectively to supply hard water to the softener 2 and to discharge softened water from the softener 2, and at the same time isolate softener 1 from those functions essential to the softening phase. At this time, however, the channel 40 in the fourth zone has moved so as to register with the ports 41 and 34, while in the third zone the channel 29 has assumed a position of registry with the ports 36 and 44. The port 34 is in direct communication with the hard water main which passes through the ejector 46, the induction pipe 47 of which enters the brine tank 48. (Fig. 1). The jet of hard water entrains the brine, the brine flow continuing through a pipe 49, port 34, channel 40, port 41, pipe 5, into tank 1 near the top. After percolating through the zeolite and exchanging the sodium for the calcium which the zeolite has extracted from the hard water, the brine flows through pipe 11, pipe 50, port 36, channel 29, port 44, pipe 51 to the sewer.

Fig. 9 shows the relative positions of channels and ports when the valve barrel has rotated through an additional angle of 22½°. A glance at the first and second zones shows that the softener 1 is still excluded from the water softening function, and the position of the channels 29 and 40 in the third and fourth zones, shows that the brine flow has now been cut off. With regard to softener 2, it is still performing its water softening function, receiving hard water by way of port 16, channel 15, port 26, pipe 27, and delivering softened water by way of pipe 12, pipe 52, port 24, channel 25, port 20 to the service pipe 22.

Now, passing to Fig. 10, it is noted that the valve barrel has moved 45° further and that in the first zone the channel 15 has moved to a position in which hard water supply port 17 is now in communication with port 53 which takes the hard water to the softener 1. By following the soft water outlet 11 it is found to be blocked in the second zone so that softener 1 is still cut off from the service pipe 22. However pipe 11 communicates with pipes 54 and 55, leading to the port 56. Channel 29 in the third zone now brings this port into register with the port 57 which communicates by pipe 58 with the sewer. The hard water that enters at this period has therefore the purpose of flushing out the residual brine from the mass of zeolite, before the softener 1 is again opened to communication with the soft water service pipe.

Fig. 11 shows the positions of the channels when the valve barrel has again moved 45°. Ports 18 and 19 in the first zone are each half way open to the hard water supply coming into the channel 15 by way of port 17, showing that hard water is now being admitted to both softeners, the supply admitted to softener 1 being increased, while that admitted to softener 2 is decreased. From an inspection of the second zone it will be seen that channel 25 is, in similar manner, receiving soft water from both softeners. All the ports in the third and fourth zones are blocked in this position of the valve barrel.

In Fig. 12 the valve barrel is turned as shown in zones 1 and 2 so as to exclude softener 2 from the water softening phase and to place softener 1 into full capacity water softening operation. Zone 3 shows the hard water conducted by way of ports 75 and 58 and channel 29, entering contra-flow into the lower part of softener 2 for the purpose of back wash. The fourth zone shows the channel 40 placing in communication the ports by means of which the back wash flows from the pipe 6 to the pipe 61 and to the sewer.

In Fig. 13 the valve barrel is shown to have advanced 22½° from its previous position as illustrated, bringing the channels 40 and 29 in the fourth and third zones into registry with the pairs of ports 60, 63 and 64, 65 respectively connecting the upper part of the softener 2 to the brine flow, and the lower part to the sewer.

The cycle has now been completed. The brine flow in softener 2 is followed by the flushing described at the start in connection with Fig. 4.

It is to be understood that the complicated layout of the piping as shown is diagrammatic and has been done in the interest of showing the several sections through the valve side by side instead of coaxial. As they would be in the real material embodiment, and that in practice, the pipe connections may be made comparatively simple.

While the above detailed description relates particularly to a softening system of the "down flow" type, it will readily be appreciated that the invention is as well adapted to other types, for example the "up flow" system shown in Fig. 14.

Obviously, since the hard water normally flows in Fig. 14, from the bottom upwardly through the zeolite in the normal water softening periods of the apparatus, no back wash is required, and this function is omitted from the practice of the invention. This omission results in sumplification in the illustration of this form of the invention. Referring somewhat in detail to Fig. 14, the four zones are indicated in sections taken in the same planes as in the exemplification first described. In the first zone is a channel 15′ corresponding in angular amplitude to the channel 15 in Fig. 4, and performing the same functions with respect to the hard water inlet ports 66 and 67 and the hard water outlet ports 68 and 69, which lead respectively to the lower part of the softeners 70 and 71.

In the second zone is shown the channel 25′ corresponding to the channel 25 in the first described form, and controlling the soft water ports 73 and 74 which connect with pipes that lead from upper parts of the respective softeners 70 and 71, and the ports 75 and 76 which connect with the soft water service pipes. The fourth zone shows brine inlet ports 77 and 78 and brine outlet ports 79 and 80, which when one of each pair is connected by the channel 40′, opens a flow of brine tank 48 to the upper part of one or the other of the softeners. At this same time, whichever softener is receiving the brine flow, is discharging the same from the lower part by a pipe leading to the ports 81 or 82 in the third zone, which ports are at the time connected by the channel 29′ to the sewer through either port 83 or 84.

The brine flow is followed by flushing out of the brine with the hard water, which function is accomplished with the channel 40′ in the fourth zone and the channel 29′ in the third zone, respectively in registry with the ports 79 and 85, and 81 and 83, or alternately with ports 80 and 86, and 82 and 84.

It is to be noted that the channel 29′ has sufficient angular amplitude to maintain the waste or sewer connection open to whichever softener is receiving the brine flow, not only through the brine regenerative period, but through the flushing period that follows, as well.

Although both exemplary forms of the invention have been described in connection with the use of hard water from the pressure mains as the actuating vehicle for lifting the brine, through the agency, for instance, of the ejector, it is within the purview of the invention to have the brine supplied in any other desired manner. The arrangement as shown and described has the advantage that the injection of brine involves the use of the pressure water and this in turn causes the operation of the meter which actuates the valve. Thus it is impossible for the valve to come to rest, through lack of use of soft water, with excess brine running to waste through the softener which is being regenerated.

It is also understood that the use of zeolite in the softener tanks is merely incidental and not vital to the carrying out of the invention so that the invention contemplates the extension of this principle to filtering means, for instance, in which inert minerals may take the place of the zeolite. In this instance, of course, the phase of the brine flow would be unnecessary, and the apparatus correspondingly simplified.

While I have in the above description endeavored to define what I believe to be practical and preferred embodiments of my invention, yet it is to be understood that the details of construction as shown and described, are merely by way of example and not to be considered limitative in their bearing upon the scope of the invention.

What I claim is:—

1. In combination, water treatment tanks, a service pipe for delivering treated water, a source from which untreated water is supplied to said tanks, and a single valve, operating responsive to the flow of untreated water to said tanks, for alternately connecting one or the other of said tanks concurrently with the source of untreated water and with the said service pipe.

2. In combination, water treatment tanks, a service pipe for delivering treated water, a source from which untreated water is supplied to said tanks, and a single valve operating responsive to the flow of untreated water to said tanks for alternately connecting one or the other of said tanks concurrently to the said source of untreated water, and to said service pipe, said valve being constructed so that the periods during which the supply source and the service pipe are connected, through each tank, overlap.

3. In combination, water treatment tanks each including a body of mineral through which water is passed, in treatment, a service pipe for delivering treated water having branches connected to said tanks on one side of said mass of mineral, a supply conduit for untreated water having branches connected to said tanks on the opposite sides of said masses of mineral, and a single valve operating responsively to the flow of untreated water to said tanks, said valve being constructed to alternately connect one or the other of said tanks concurrently to said supply conduit and to said service pipe.

4. In combination, water treatment tanks each including a body of mineral through which the water flows, in treatment, supply, service, and waste pipes connected to said tanks, said supply and service pipes communicating with said tanks on opposite sides of said body of mineral, a single valve intercalated in said supply, service and waste pipes, means responsive to the supply flow of water to said tanks for operating said valve, said valve being constructed so as alternately, for a determined period, to establish continuous flow through one or the other of said tanks from said supply to said service pipes, and to establish a flow through said tanks from said supply to said waste pipe, for periods during which the flow from said supply to said service pipes is cut off.

5. In combination, water treatment tanks each including a body of mineral through which the water flows, in treatment, supply, service and waste pipes connected to said tanks, said supply and service pipes entering said tanks at opposite sides of said body of mineral, a single valve intercalated in said supply, service and waste pipes, means responsive to the supply flow of water to said tank for operating said valve, the latter including means alternately, for a predetermined period, for establishing a continuous flow through one or the other of said tanks from said supply to said service pipe, means for establishing a flow through said tanks from said supply to said waste pipe, first, from the bottom to the top, and then from the top to the bottom of said tanks, during alternate periods when the flow from the supply to the service pipes is cut off by said valve, from one or the other of said tanks.

6. In combination, water treatment tanks each including a body of mineral through which the water flows, in treatment, supply, service and waste pipes, said supply and service pipes being connected to said tanks at opposite sides of said body of mineral, a single valve intercalated in said supply, service and waste pipes, means responsive to the supply flow of water to said tanks for operating said valve, the latter including means, alternately, for a determined period, for establishing a continuous flow through one or the other of said tanks from said supply to said service pipes, said means being constructed to cause said periods of flow slightly to overlap so that a uniform maximum flow is continually available from said service pipe while the flow period in one tank is closing and the other opening.

7. In combination, water softening tanks each including a body of zeolites through which the water flows and by which it is softened, supply, service and waste pipes, said supply and service pipes being connected to said tanks at opposite sides of said body of zeolites, a source of brine, and a pipe for conducting brine to said tanks, a single valve intercalated in said supply, service, brine and waste pipes, means responsive to the supply flow of water to said tanks for operating said valve, the latter including means alternately, for a determined period, for establishing a continuous flow through one or the other of said tanks from said supply to said service pipes, and including means for establishing a flow through said tanks from said supply to said waste pipe, first, from the bottom to the top, and then from the top to the bottom of each tank during periods when the supply to the service pipe is cut off by said valve, and means connecting said brine pipe to said tanks at periods between the reverse flow periods of connection of said supply source to said waste pipe.

8. In combination, water treatment tanks, a service pipe for delivering treated water, a supply pipe for supplying untreated water, a barrel valve for alternately serving said tanks, including a casing and barrel, said casing having two pairs of ports in each of two zones, the ports of each pair being arranged at diametric points, means connecting one pair of ports in the first named zone to the supply pipe, means connecting the ports of the other pair in the first zone to the respective tanks, means connecting one pair of the ports in the second named zone to the service pipe, means connecting the ports of the other pair in the second zone to the respective tanks, said barrel having channels, in said two zones cooperating with the said ports, and extending through 180° of arc, and arranged to concurrently supply water to, and deliver water from, each tank.

9. In combination, water treatment tanks, a service pipe for delivering treated water, a supply pipe for supplying untreated water, a barrel valve for alternately serving said tanks, including a casing and barrel, said casing having two pairs of ports in each of two zones, the ports of each pair being arranged at diametric points, means connecting one pair of ports in the first named zone to the supply pipe, means connecting the ports of the other pair in the first zone to the respective tanks, means connecting one pair of the ports in the second named zone to the service pipe, means connecting the ports of the other pair in the second zone to the respective tanks, said barrel having channels, in said two zones cooperating with the said ports, and extending through 180° of arc, and arranged to concurrently supply water to, and deliver water from, each tank, said valve being provided with ports and cooperating channels in other zones, and an additional pair of diametrically arranged ports in said first named zone, circumferentially offset from the first mentioned supply ports, said ports in said other zones and said additional ports in said first mentioned zone cooperating with suitable channels in the valve barrel to direct the supply water simultaneously counterflow through said tanks, each in alternation, and to a drain.

10. In combination, a water softening system including water softening tanks, a body of zeolite in each tank, a service pipe for delivering treated water, a supply pipe for supplying untreated water, a barrel valve for alternately serving said tanks including a casing and a barrel, said casing having two pairs of ports in each of two zones, the ports of each pair being arranged at diametric points, means connecting one pair of ports in the first named zone, to the supply pipe, means connecting the ports of the other pair in the first named zone to the respective tanks, means connecting one pair of the ports in the second mentioned zone to the service pipe, means connecting the ports of the other pair in the second mentioned zone to the respective tanks, said barrel having channels in said two zones cooperating with the said ports, and extending through 180° of arc, and arranged to concurrently supply water to and deliver water from each tank, brine ports in said casing connected to a source of brine and cooperating with suitable channels in said valve barrel to conduct a brine flow through the body of zeolites in each tank, and to a drain, in those phases of the cycle of operation in each tank in which the connection of said tank to the service pipe is cut off.

In testimony whereof I have signed my name to this specification.

WILLIAM E. DUNBAR.